US011196217B2

(12) United States Patent
Tremblay (10) Patent No.: US 11,196,217 B2
(45) Date of Patent: Dec. 7, 2021

(54) VARIABLE CASE THICKNESS ACCOMMODATION PLUG SYSTEMS AND METHODS

(71) Applicant: FLIR Systems, Inc., Wilsonville, OR (US)

(72) Inventor: Marcel Tremblay, Goleta, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 16/365,902

(22) Filed: Mar. 27, 2019

(65) Prior Publication Data

US 2019/0221968 A1    Jul. 18, 2019

Related U.S. Application Data

(63) Continuation of application No. PCT/US2017/055657, filed on Oct. 6, 2017.

(60) Provisional application No. 62/405,794, filed on Oct. 7, 2016.

(51) Int. Cl.
| | |
|---|---|
| *H01R 13/44* | (2006.01) |
| *H01R 13/631* | (2006.01) |
| *G06F 1/16* | (2006.01) |
| *H01R 13/50* | (2006.01) |
| *H01R 13/516* | (2006.01) |
| *H01R 43/20* | (2006.01) |
| *H04M 1/02* | (2006.01) |
| *H01R 13/627* | (2006.01) |
| *H04B 1/3827* | (2015.01) |
| *H04N 5/225* | (2006.01) |

(52) U.S. Cl.
CPC ......... *H01R 13/631* (2013.01); *G06F 1/1632* (2013.01); *H01R 13/50* (2013.01); *H01R 13/516* (2013.01); *H01R 43/20* (2013.01); *H01R 13/6277* (2013.01); *H04B 1/3827* (2013.01); *H04M 1/0274* (2013.01); *H04N 5/2252* (2013.01); *H04N 5/2253* (2013.01)

(58) Field of Classification Search
CPC ...... H01R 35/04; H01R 35/025; H01R 35/02; H01R 13/518; H01R 13/631; H01R 13/50; H01R 13/516; H01R 43/20; G06F 3/1632
USPC ............ 439/131, 164, 165, 534; 361/679.41
See application file for complete search history.

(56) References Cited

U.S. PATENT DOCUMENTS

| | | | |
|---|---|---|---|
| 6,193,546 B1 * | 2/2001 | Sadler .................... | H04M 1/04 439/534 |
| 6,275,002 B1 * | 8/2001 | Chen ..................... | H01M 10/46 320/111 |
| 6,527,572 B2 * | 3/2003 | Jou ..................... | H01R 13/6315 439/247 |
| 6,672,558 B2 * | 1/2004 | Li ......................... | G06F 1/1626 248/439 |

(Continued)

FOREIGN PATENT DOCUMENTS

| | | |
|---|---|---|
| EP | 3010211 | 4/2016 |
| WO | WO 2018/068018 | 4/2018 |

*Primary Examiner* — Thanh Tam T Le
(74) *Attorney, Agent, or Firm* — Haynes and Boone, LLP (57) ABSTRACT

Systems and techniques are disclosed for an electronic device that may be coupled to an external device via a connector. The external device may have a protective cover, and different protective covers may have different thicknesses. The electronic device may include a connector adjustment mechanism that may adjust a position of the connector depending on the cover thickness.

20 Claims, 11 Drawing Sheets

(56) References Cited

U.S. PATENT DOCUMENTS

| | | | | |
|---|---|---|---|---|
| 7,090,521 B2* | 8/2006 | Nishio | H01R 13/6315 | 439/248 |
| 7,445,479 B2* | 11/2008 | Fan | H01R 29/00 | 439/131 |
| 7,535,616 B2* | 5/2009 | Hironishi | G02F 1/0136 | 359/280 |
| 7,628,628 B2* | 12/2009 | Matsuda | H01R 13/6315 | 439/247 |
| 7,675,746 B2* | 3/2010 | Crooijmans | G06F 1/1632 | 361/679.41 |
| 7,695,301 B2* | 4/2010 | Mudge, III | H01R 13/533 | 439/271 |
| 7,817,414 B2* | 10/2010 | Chou | G06F 1/1632 | 361/679.41 |
| 7,850,468 B2* | 12/2010 | Ni | G06K 19/07732 | 439/131 |
| 7,929,291 B2* | 4/2011 | Park | G06F 1/1632 | 361/679.41 |
| 8,405,974 B2* | 3/2013 | Sayavong | G06F 1/1632 | 361/679.43 |
| 8,582,289 B2* | 11/2013 | Zhou | F16M 13/00 | 361/679.41 |
| 8,608,123 B2* | 12/2013 | Takahashi | H04M 1/04 | 248/346.01 |
| 8,638,064 B2* | 1/2014 | Sulem | H01R 24/28 | 320/107 |
| 8,672,692 B2* | 3/2014 | Chun | H01R 35/04 | 439/131 |
| 8,721,356 B2* | 5/2014 | Webb | H04M 1/0274 | 439/248 |
| 8,780,546 B2* | 7/2014 | Zhou | H01R 27/00 | 361/679.41 |
| 8,801,441 B2* | 8/2014 | Zhang | H02J 7/0044 | 439/131 |
| 8,821,173 B2* | 9/2014 | Carnevali | G06F 1/1632 | 439/248 |
| 8,842,428 B2* | 9/2014 | Zhou | G06F 1/1632 | 361/679.41 |
| 9,088,086 B2* | 7/2015 | Tseng | H01R 35/00 | |
| 9,118,749 B2* | 8/2015 | Kim | H02J 7/0044 | |
| 9,192,067 B2* | 11/2015 | Kim | G06F 1/1632 | |
| 9,318,906 B2* | 4/2016 | Kim | H04M 1/04 | |
| 9,356,408 B1 | 5/2016 | Biddle et al. | | |
| 9,454,183 B2* | 9/2016 | Suckle | G06F 1/1632 | |
| 10,209,740 B2* | 2/2019 | Vroom | G06F 1/1632 | |
| 2007/0015555 A1 | 1/2007 | Bogner | | |
| 2014/0011549 A1 | 1/2014 | Shu et al. | | |
| 2015/0036283 A1 | 2/2015 | Suckle et al. | | |

* cited by examiner

VARIABLE CASE THICKNESS ACCOMMODATION PLUG SYSTEMS AND METHODS

CROSS-REFERENCE TO RELATED APPLICATIONS

This application is a continuation of International Patent Application No. PCT/US2017/055657 filed Oct. 6, 2017 and entitled "VARIABLE CASE THICKNESS ACCOMMODATION PLUG SYSTEMS AND METHODS," which is incorporated herein by reference in its entirety.

International Patent Application No. PCT/US2017/055657 filed Oct. 6, 2017 claims priority to and the benefit of U.S. Provisional Patent Application No. 62/405,794 filed Oct. 7, 2016 and entitled "VARIABLE CASE THICKNESS ACCOMMODATION PLUG SYSTEMS AND METHODS," which is hereby incorporated by reference in its entirety.

TECHNICAL FIELD

The present invention relates generally to electronic devices and more specifically to modular electronic devices configured to interface with other devices.

BACKGROUND

Electronic devices increasingly are configured to couple to other devices. Such coupling may allow devices to add additional capabilities such as imaging in additional wavelengths.

SUMMARY

Systems and related techniques are provided for an apparatus configured to couple to another device. In certain embodiments, an apparatus may be provided and may include a housing including an opening, an electrical circuit disposed within the housing, a connector configured to interface with an external electronic device and disposed at least partially within the housing, where at least a portion of the connector is disposed within the opening, an adjuster at least partially disposed within the housing and configured to adjust a position of the connector between at least three positions relative to the housing, and a holding mechanism disposed within the housing, coupled to the connector and the adjuster, and configured to, when in a holding position, hold the adjuster in one of the at least three positions.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

In certain embodiments, systems and techniques may be disclosed herein for devices with a connector adjustment mechanism. Such devices may include, as non-limiting examples, one or more imaging modules, card readers, medical devices (e.g., fitness trackers, blood sugar readers, and/or other such devices), audio devices, and/or other such devices and may be configured to interface with personal electronic devices that may be protected by protective covers with a variety of different thickness. In certain such embodiments, the devices may include an adjustable connector to accommodate the covers of different thicknesses.

As the size and weight of infrared cameras has decreased over time, their use has expanded to personal electronic devices. In certain embodiments, imaging modules, whether visual, thermal, and/or through other wavelengths, may be removable modules that may interface with personal electronic devices. For example, such imaging modules may be a secondary device that may be plugged into personal electronic devices such as smartphone, tablet, laptop computer, desktop computer, and/or other such electronic device. Certain such electronic devices may include cases and/or other such protective covers. As there may be a variety of such protective covers, such covers may also be a variety of different thicknesses.

Reference may be made to thermal, infrared, radiant, radiance, irradiance, and/or other images and bands. For the purposes of this disclosure, such reference may be used to, generally, refer to temperature based (e.g., infrared wavelength) imaging.

Figure 1:
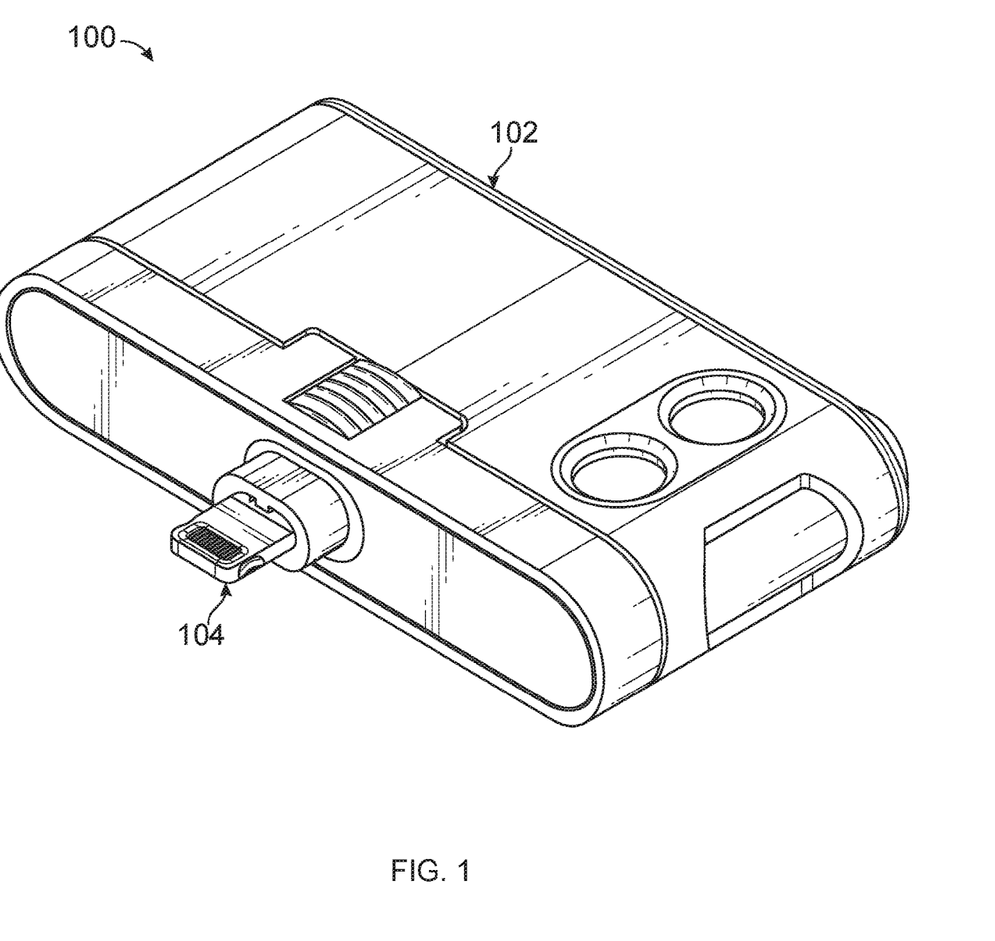
FIG. 1 illustrates an imaging module with a connector adjustment mechanism in accordance with an embodiment of the disclosure.

FIG. 1 illustrates an imaging module with a connector adjustment mechanism in accordance with an embodiment of the disclosure. FIG. 1 may illustrate imaging module 100. Imaging module 100 may be an imaging module that may capture an image, a plurality of images, and/or video in visual, thermal, and/or other wavelengths. In certain embodiments, imaging module 100 may include an imaging module body 102 and a retractable connector 104. The retractable connector 104 may retract and extend from the imaging module body 102.

In certain such embodiments, the retractable connector 104 may fully retract into the imaging module body 102, while other embodiments may retract the retractable connector 104 to a minimum distance (e.g., a where the connector may still be plugged into a personal electronic device while in the fully retracted position). Additionally, the retractable connector 104 may extend to any distance from the imaging module body 102, including extending less than 2 mm from the fully retracted position, extending less than 10 mm from the fully retracted position, extending less than 50 mm from the fully retracted position, and/or extending more than 50 mm from the fully retracted position. For example, in certain embodiments, the connector 104 may extend a range of between 1 to 4 mm from the imaging module body 102.

Figure 2:
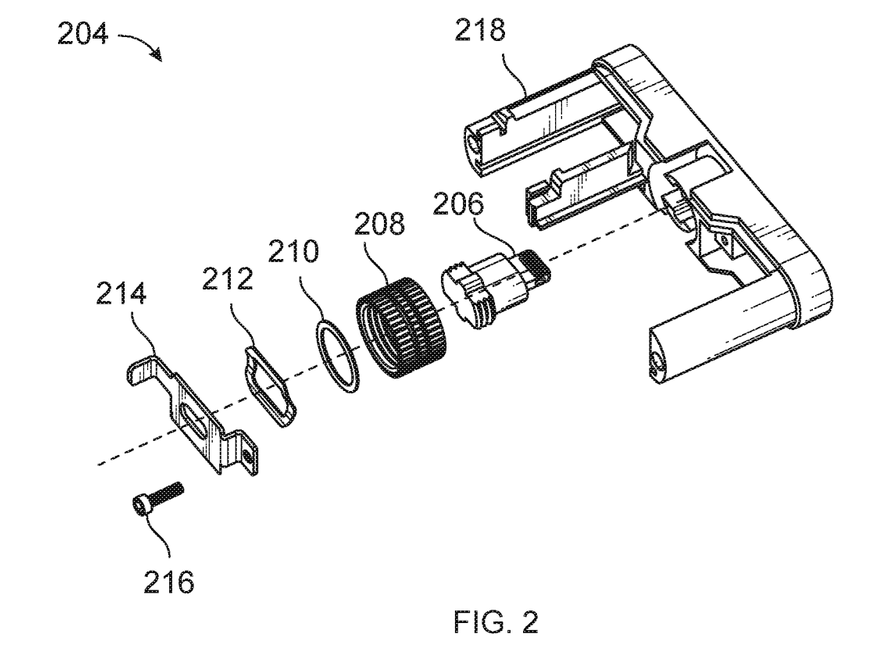
FIG. 2 illustrates an exploded view of a connector adjustment mechanism in accordance with an embodiment of the disclosure.

FIG. 2 illustrates an exploded view of a connector adjustment mechanism in accordance with an embodiment of the disclosure. Connector adjustment mechanism 200 in FIG. 2 may include a bezel 218, a connector 206, an adjuster 208, a gasket 210, a spring 212, a retainer 214, and a mounting screw 216.

The bezel 218 may be a cover that, when the connector adjustment mechanism is fully assembled within the imaging module 100, prevents access to the other components of the connector adjustment mechanism 200. In certain embodiments, the bezel may also be cosmetic and/or may include openings for buttons, lights, screens, and/or other components of the imaging module 100.

The connector 206 may be a connector that may be configured to interface with one or more personal electronic devices (e.g., an iPhone®, an Android® device, a Windows® device, a laptop, a tablet, and/or other such personal electronic device). In certain embodiments, the connector 206 may be a standard connector (e.g., an Apple®30 pin connector, a Lightning cable, USB 1.X, 2.0, 3.0, 3.1, Type-C, and/or other such connector standards).

The adjuster 208 may be an adjuster that, upon manipulation, may adjust the position of the connector 206. In certain embodiments, the adjuster 208 may allow for adjustment over an infinite amount of positions, while other embodiments may allow for adjustment over a set amount of positions (e.g., two positions, three positions, four positions, or five or more positions). The adjuster 208 may be one or more rollers, buttons, levers, touchscreens, and/or other such item that may allow for a user to interface with the adjuster 208 to adjust the position of the connector 206.

The gasket 210 may be a gasket that may minimize wear of certain components of the connector adjustment mechanism 200. In certain embodiments, the gasket 210 may, for example, be a gasket that may prevent direct contact between the adjuster 208 and the spring 212.

The spring 212 may, in certain embodiments, apply a force to, for example, the adjuster 208 to hold the adjuster 208 in a fixed position unless a force greater than a threshold force is applied. As such, the spring 212 may provide a constant retention force and/or minimize and/or eliminate play from the adjuster 208 and may be a holding mechanism and/or a portion of a holding mechanism. The spring 212 may be, for example, a leaf spring, a coil spring, a flat spring, a cantilever spring, a helical spring, a torsion spring, and/or another such spring that may provide force. In certain such embodiments, the spring 212 may typically hold the adjuster 208 in a holding position. In the holding position, the position of the adjuster 208 (and, thus, the connector 206) may be fixed. If a force greater than a threshold force is applied (e.g., by applying a torque to attempt to rotate the adjuster 208), the adjuster 208 may be moved and thus may move the position of the connector 206.

Certain other embodiments may include other mechanisms that may be configured to hold the adjuster 208 in a fixed position unless a force greater than a threshold force is applied. For example, threads on the adjuster 208 and/or the connector 206 may be configured to provide resistance to hold the adjuster 208 in the fixed position (e.g., via a friction fit). Additionally, cams, ratchets, locks, and/or other mechanisms may be used as holding mechanisms in addition or alternative to the spring 212. In certain such embodiments, the holding mechanism may be configured to hold the adjuster 208 in position until an input is received (e.g., a button is pushed, a mechanism is switched to a position to release the adjuster 208, and/or other such input). For example, the adjuster 208 may be configured to, in addition to rotating to adjust the position of the connector, be translated between a locked and an unlocked position. In certain such embodiments, the unlocked position may allow movement of the adjuster 208 to adjust the position of the connector 206, while the locked position may be configured to not allow movement of the adjuster 208. As such, in order to adjust the position of the connector 206, the adjuster 208 may need to be in the unlocked position. Certain other embodiments may not include a holding mechanism.

The retainer 214 may be a component that may hold one or more other components of connector adjustment mechanism 200 in a set position. For example, the retainer 214 may hold one or more of the spring 212, the gasket 210, and/or the adjuster 208 in a fixed relationship to the bezel 218. In certain embodiments, the retainer 214 may preload the spring 212. The mounting screw 216 may hold the retainer 214 in place.

Figure 3:
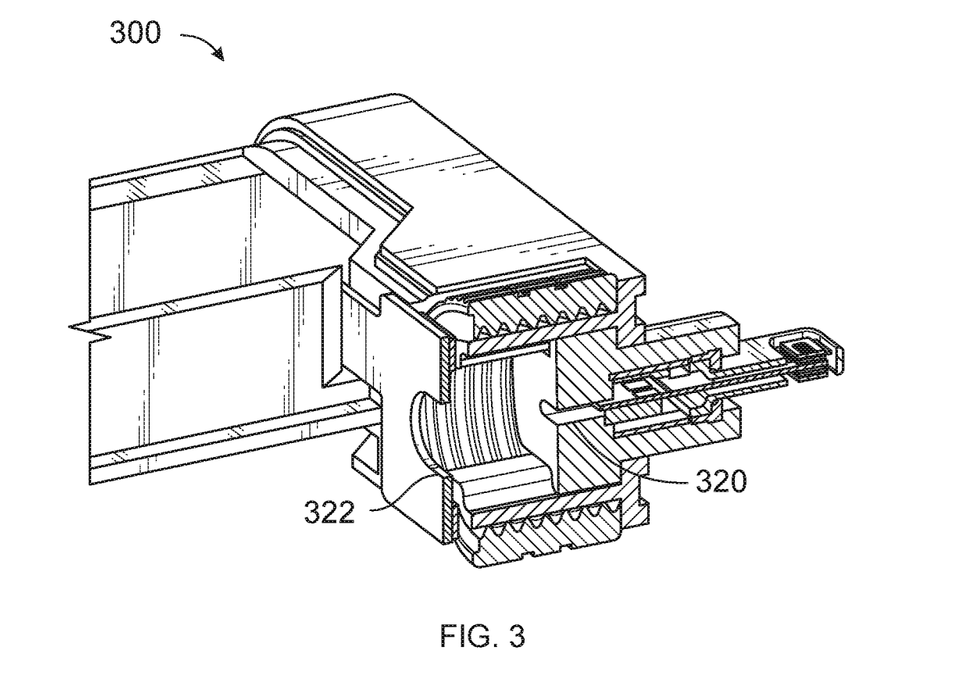
FIGS. 3-5 illustrate cutaway views of connector adjustment mechanisms in accordance with an embodiment of the disclosure.
Figure 4:
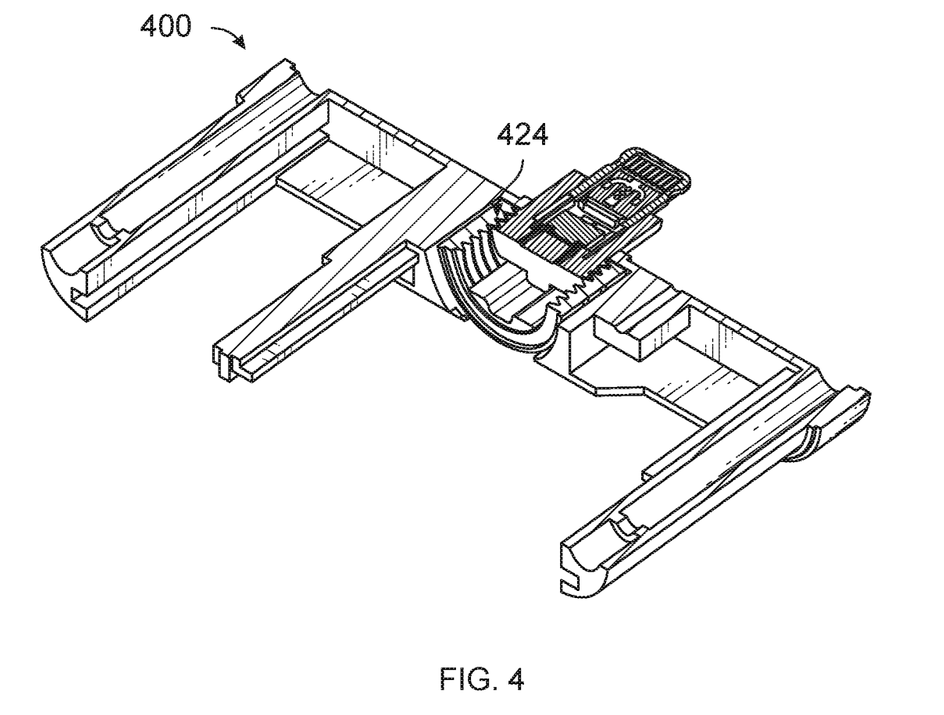
Figure 5:
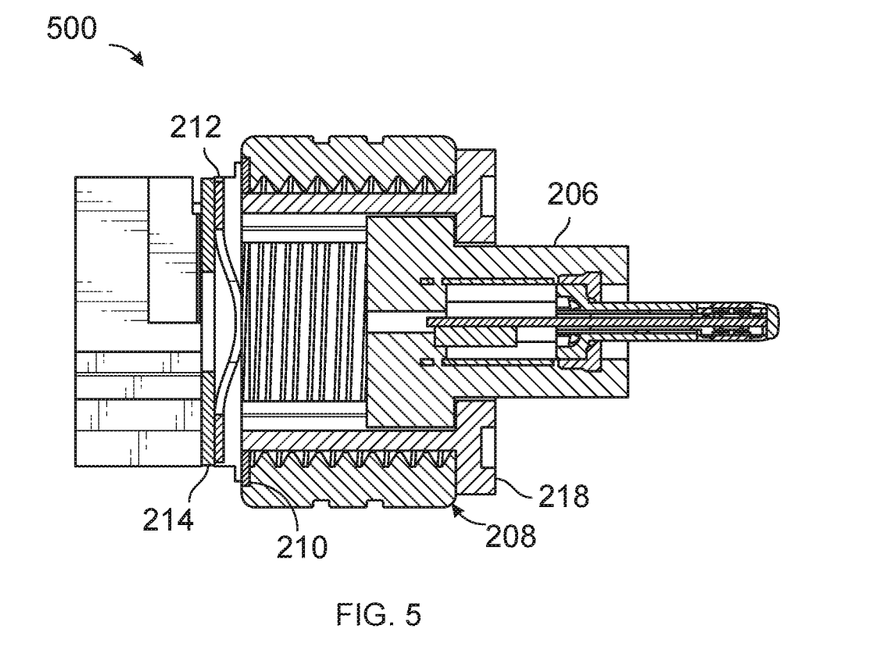

FIGS. 3-5 illustrate cutaway views of connector adjustment mechanisms in accordance with an embodiment of the disclosure. FIG. 3 may include guides 320 and 322. In certain embodiments, guides 320 and 322 may be configured to hold the connector 206 in a fixed orientation while the adjuster 208 rotates. Accordingly, guides 320 and 322 may prevent rotation of the connector 206 and may, in certain embodiments, only allow translation of the connector 206. As such, guides 320 and 322 may prevent the connector 206 from, for example, rotating with the adjuster 208. In certain other embodiments, additional features may be included to, for example, prevent the connector 206 from translating past a range of adjustment.

FIG. 4 may include threads 424. In certain embodiments, both the adjuster 208 and the connector 206 may be threaded. For example, the adjuster 208 may be threaded on an interior portion and the connector 206 may be threaded on an outside portion of the body, or vice versa. As such, rotation of the adjuster 208 may adjust the positioning of the connector 206 relative to the bezel 218. In certain embodiments, the threads may be of a fine pitch to allow for finer adjustments, but other embodiments may include coarser threads to allow for quicker adjustments.

In FIG. 5, the spring 212 may be coupled on one end to the retainer 214 and may be coupled on another end to the adjuster 208. In certain such embodiments, the spring 212 may provide a force to the adjuster 208 to provide resistance against rotation of the adjuster 208 unless a force greater than a threshold force is applied. Additionally, play of the adjuster 208 may be minimized and/or eliminated by the spring 208.

Figure 6A:
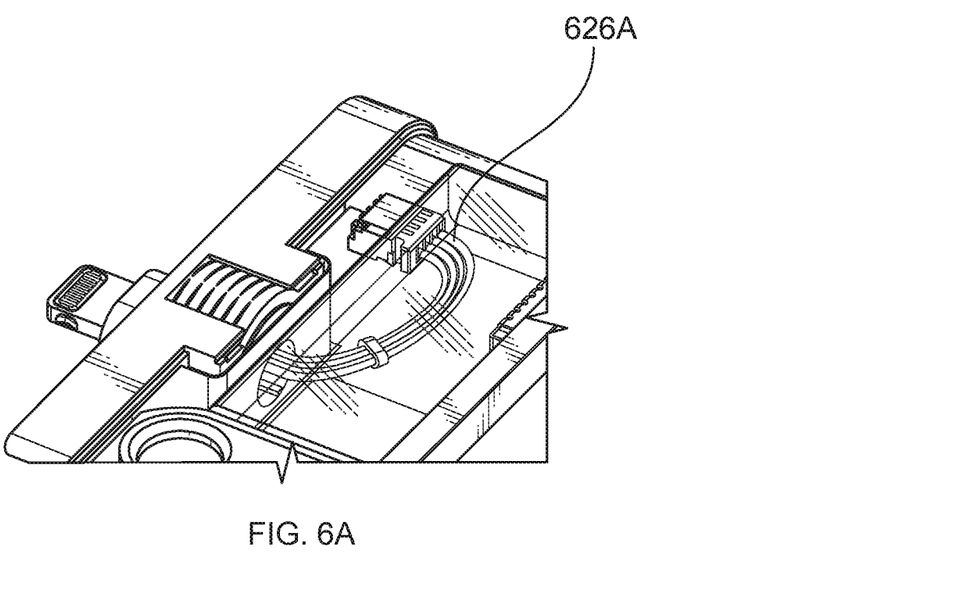
FIGS. 6A and 6B illustrate connectors used with connector adjustment mechanisms in accordance with an embodiment of the disclosure.
Figure 6B:
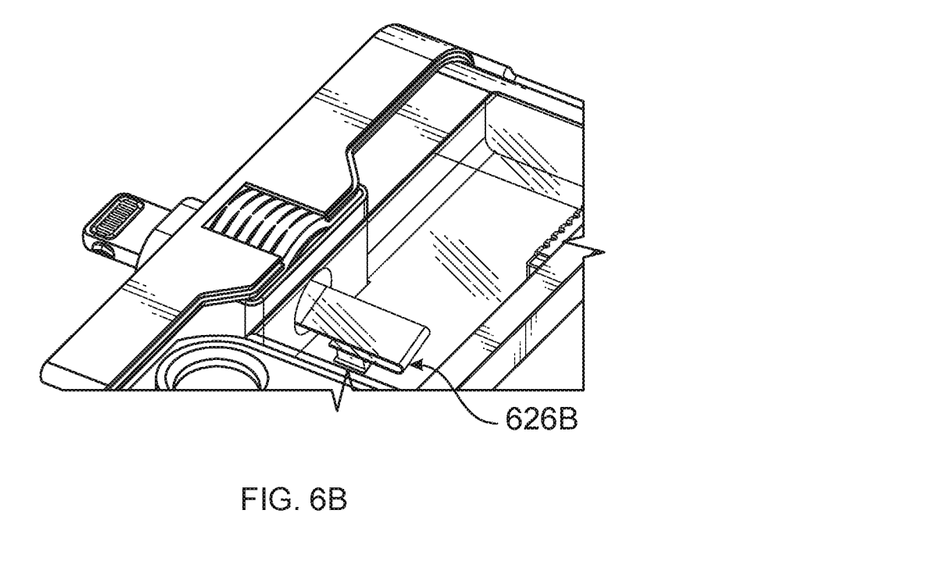

FIGS. 6A and 6B illustrate connectors used with connector adjustment mechanisms in accordance with an embodiment of the disclosure. FIG. 6A may illustrate a cable 626A that may connect the connector 206 to another component such as a PCB board (including one or more chips and/or one or more electrical circuits) of the imaging module. FIG. 6B may illustrate a flex cable and/or flex circuit board 626B that may connect the connector 206 to the other component such as the PCB board.

Figure 7:
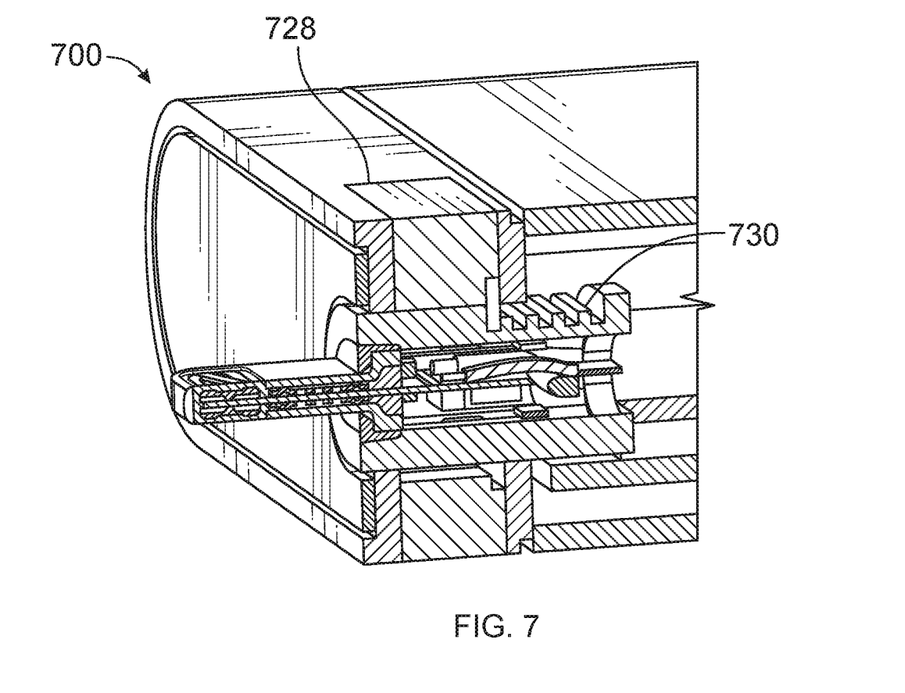
FIG. 7 illustrates an alternative connector adjustment mechanism in accordance with an embodiment of the disclosure.

FIG. 7 illustrates an alternative connector adjustment mechanism in accordance with an embodiment of the disclosure. FIG. 7 may illustrate a connector adjustment mechanism 700 that may include a plurality of positions that the connector 730 may extend and/or retract too. Connector adjustment mechanism 700 may also include a button 728 that may lock and/or unlock the position of the connector 730. In certain such embodiments, the button 728 may additionally include a spring and/or another such mechanism that may return the button 728 to a default position (e.g., a position locking the position of the connector 730) when it is not pressed.

Figure 8:
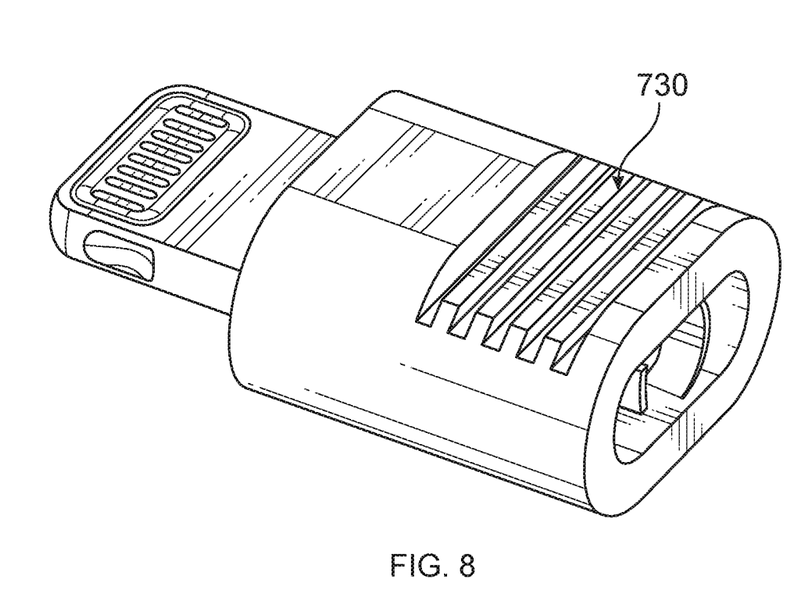
FIG. 8 illustrates a connector for use in the alternative variable length connector in accordance with an embodiment of the disclosure.

FIG. 8 illustrates a connector for use in the alternative variable length connector in accordance with an embodiment of the disclosure. FIG. 8 may illustrate a connector 730 with a plurality of detents. The detents may be configured to receive a feature of the button 728. When in the locked position, the feature of the button 728 may hold the connector 730 in a fixed position relative to, for example, the bezel of the connector adjustment mechanism 700. In the embodiment shown in FIG. 7, the connector 730 may include five detents. As such, in the embodiment shown in FIG. 7, the connector 730 may be adjusted to five different positions. Other embodiments may adjust the connector 730 to any number of other positions.

Figure 9:
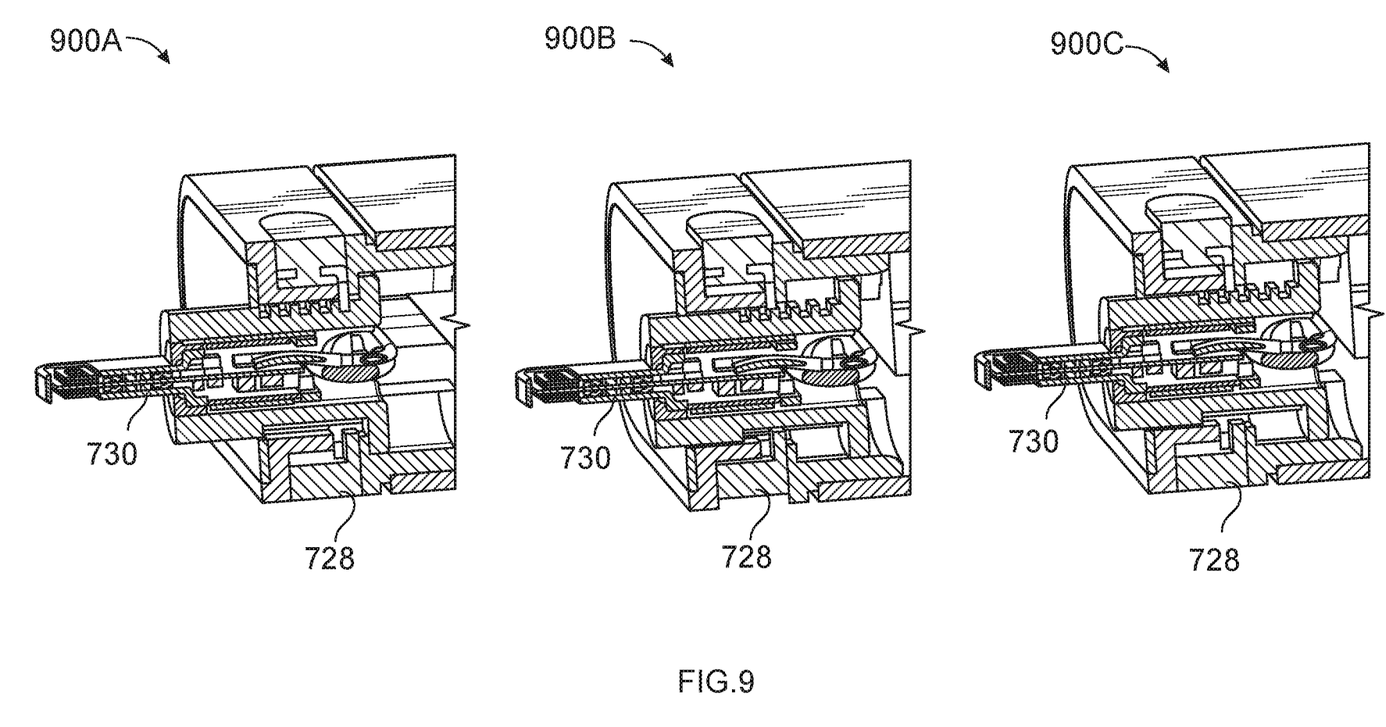
FIG. 9 illustrates a technique of adjusting a position of the alternative variable length connector in accordance with an embodiment of the disclosure.

FIG. 9 illustrates a technique of adjusting a position of the alternative variable length connector in accordance with an embodiment of the disclosure. In 900A, the connector 730 may be in a 4 mm extended position. The button 728 (e.g., the holding mechanism and/or a portion of the holding mechanism), may be in a holding position and may prevent movement of the connector 730. In 900B, the button 728 may be pressed so that the connector 730 may be unlocked and may be free to move between positions and may thus be in an open position. In 900C, the connector 730 may be adjusted to the flush position. In the flush position, the connector 730 may be flush with the bezel of the connector adjustment mechanism. In the embodiment shown in FIG. 9, the flush position may be a fully retracted position. Additionally, the connector 730 may be locked in the flush position as shown in 900C.

Figure 10:
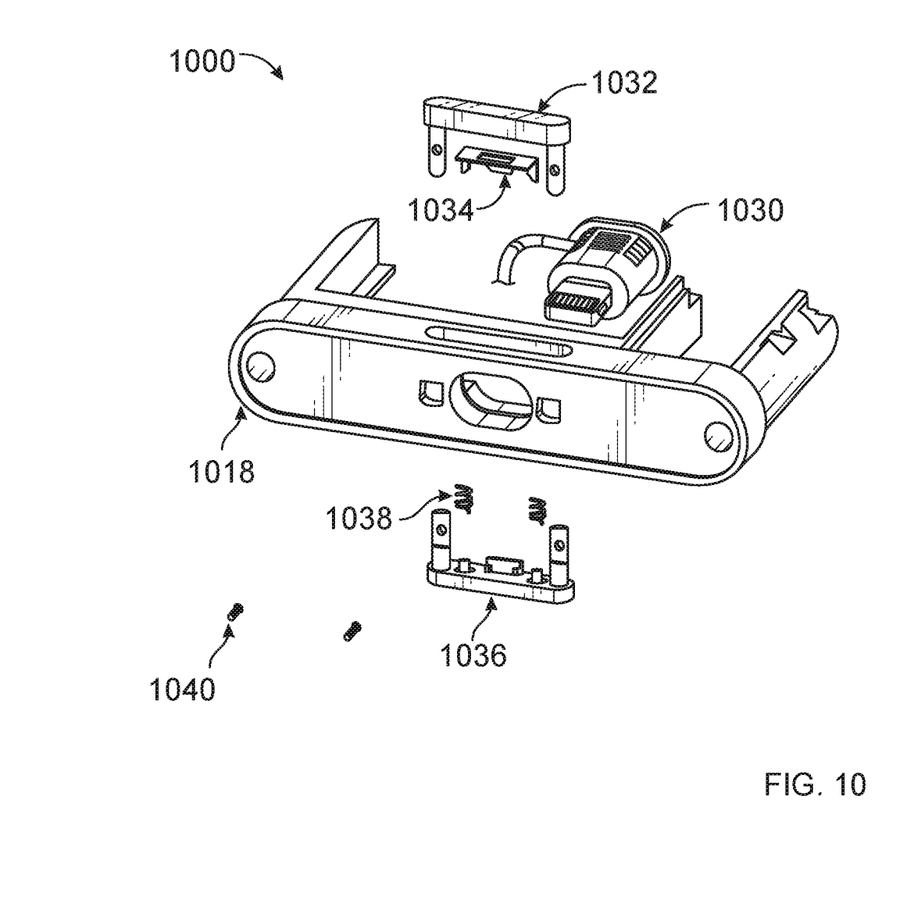
FIG. 10 illustrates components of the alternative variable length connector in accordance with an embodiment of the disclosure.

FIG. 10 illustrates components of the alternative variable length connector in accordance with an embodiment of the disclosure. The alternative variable length connector may include a bezel 1018, a connector 1030, a front button 1032 with a lock 1034, a rear button 1036, springs 1038, and pins 1040.

The connector 1030 may be similar to connectors described herein. The front button 1032 and the rear button 1036 may form a button and/or "door set" that may be disposed on either side of the alternative variable length connector. The front button 1032 and the rear button 1036 may be coupled together via the pins 1040. As such, the front button 1032 and the rear button 1036 may move as a unit. Accordingly, if one side of the button and/or "door set" is pressed, the other side may also move in response (e.g., if one side of the button is pressed into a housing, the other side may rise out of the housing). The springs 1038 may, when no force is applied, return the button to a default position (e.g., a position where the connector 1030 is locked in position by the lock 1034).

The lock 1034 may be coupled to the front button 1032. The lock 1034 may be configured to interface with detents on the connector 1030. In certain embodiments, when the button is not pressed, the lock 1034 may be configured to be disposed within one of the detents (e.g., at least a portion of the lock 1034 may be disposed between the walls of the detents) and, thus, lock the connector 1030 in position. When the button is pressed, the lock 1034 may be disposed so that it is not between the walls of the detents and, thus, allow the connector 1030 to move. Accordingly, the position of the connector 1030 may then be adjusted.

Figure 11:
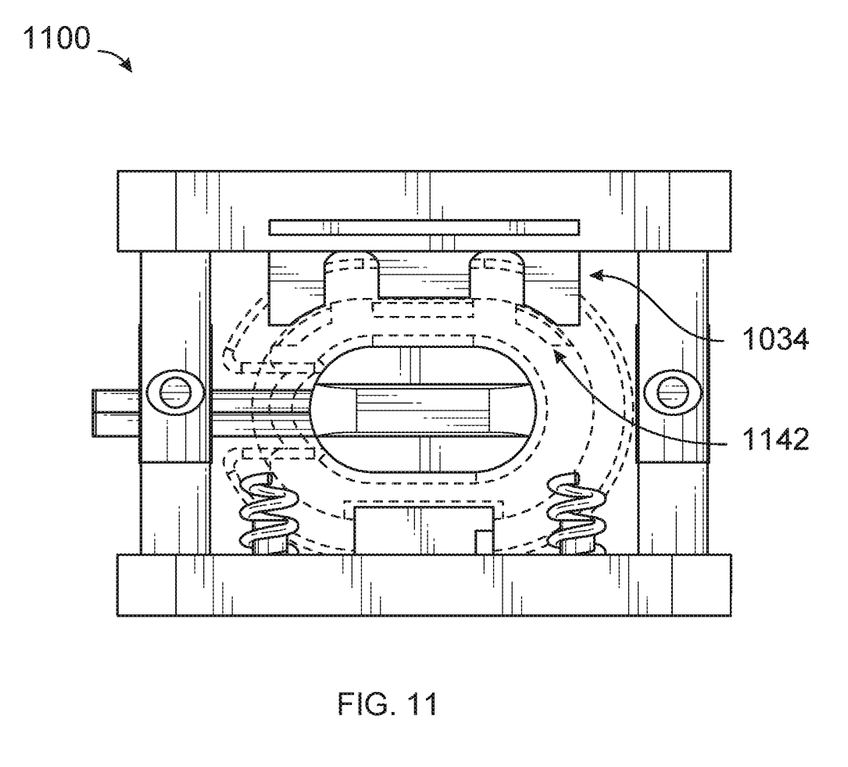
FIG. 11 illustrates a cutaway of the alternative variable length connector in accordance with an embodiment of the disclosure.

Such an example may be illustrated in FIG. 11. FIG. 11 illustrates a cutaway of the alternative variable length connector in accordance with an embodiment of the disclosure. In FIG. 11, the connector may include detents 1142. When the button 1032 is not pressed, the lock 1034 may be disposed within at least one of the detents 1142. Certain embodiments may include locks that may be configured to be disposed within a plurality of the detents 1142. When the button 1032 is pressed, the lock 1034 may be moved so that the lock 1034 is not disposed within the detents 1142. As such, the position of the connector may be free to be adjusted.

Figure 12A:
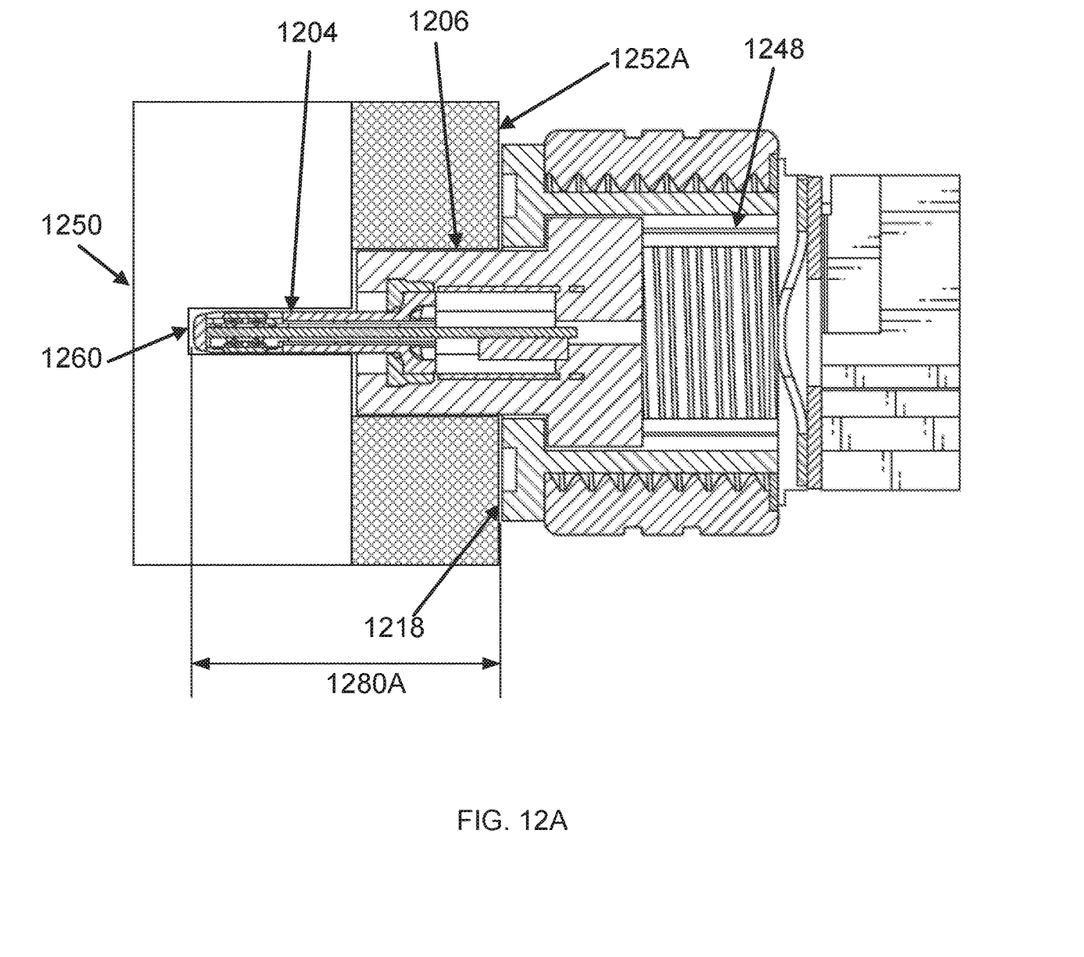
FIGS. 12A-C illustrate cutaway views of connector adjustment mechanisms interfacing with other electronic devices in accordance with embodiments of the disclosure.
Figure 12B:
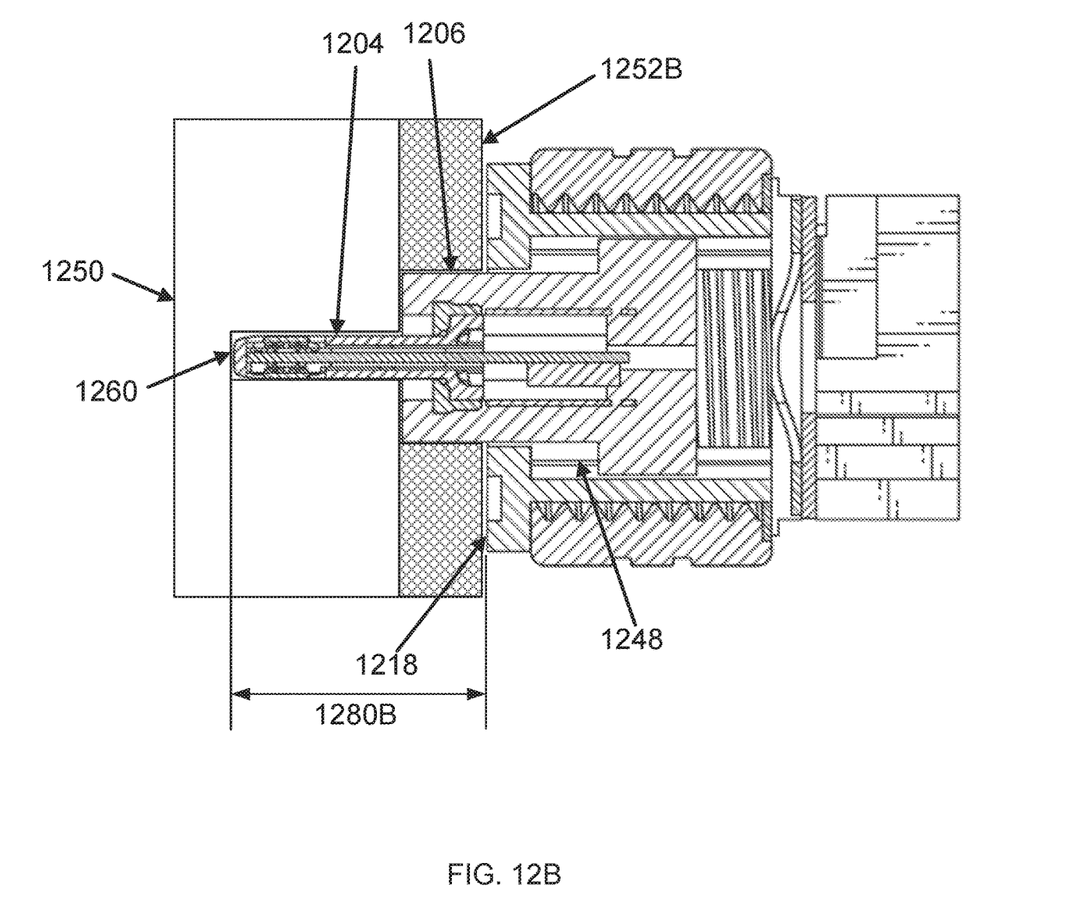
Figure 12C:
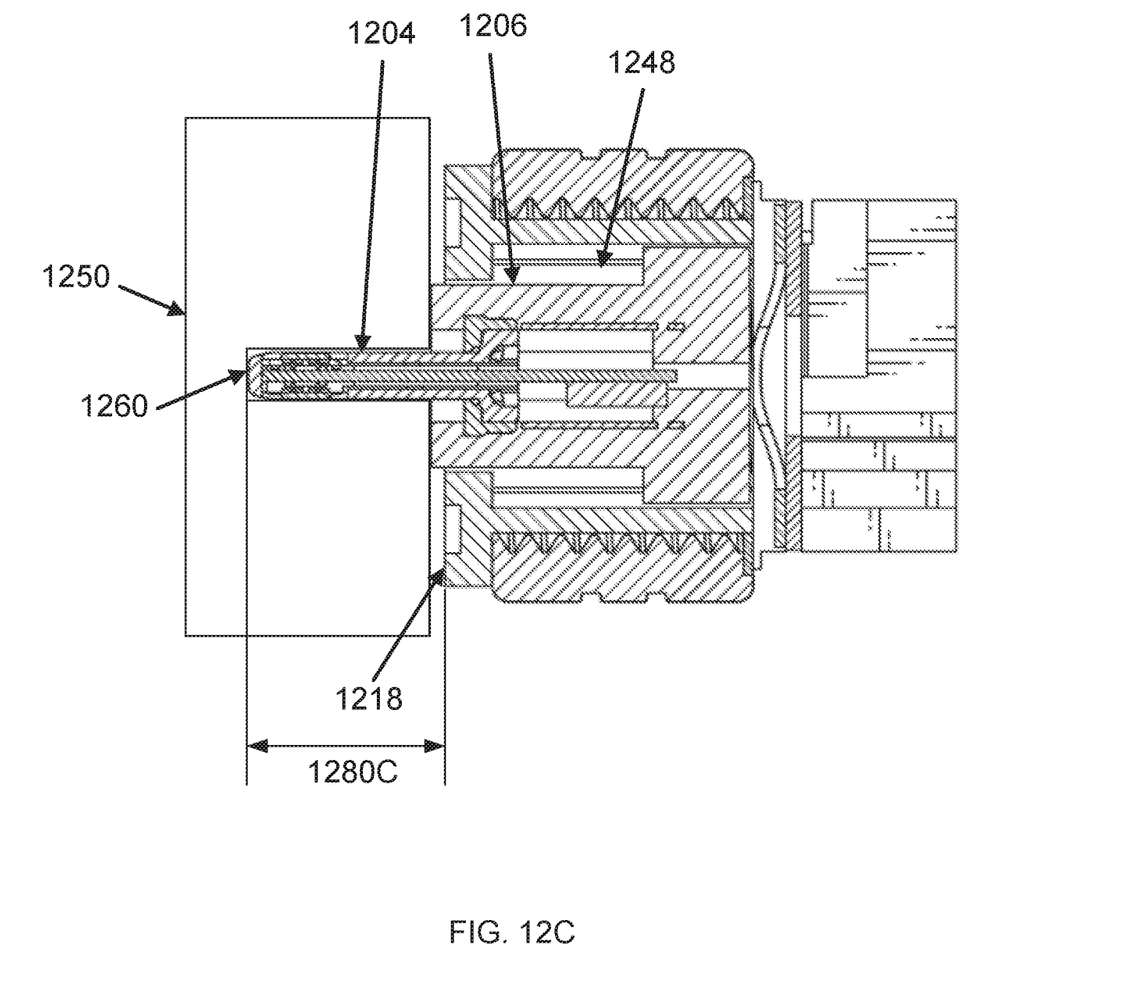

FIGS. 12A-C illustrate cutaway views of connector adjustment mechanisms interfacing with other electronic devices in accordance with embodiments of the disclosure. As shown in FIG. 12A, retractable connector 1206 may be fully extended and plug 1204 may be inserted into receptacle 1260 of electronic device 1250 which may be any type of electronic device including an imaging module, smartphone, tablet, laptop computer, desktop computer, and/or other such electronic device. Retractable connector 1206 may adjust in position so that the horizontal distance between plug 1204 and bezel 1218 (shown as distance 1280A in FIG. 12A) may be varied to, for example, accommodate coverings of electronic device 1250 of various thicknesses. Additionally, one or more features may hold retractable connector 1206 in such a position when no appropriate external force (e.g., turning of a knob or pushing of a release) is applied. Thus, even when plug 1204 is inserted into receptacle 1206, force applied from such insertion may not be force applied in the appropriate manner and so may not substantially move the position of plug 1204 and retractable connector 1206.

Electrical connections (e.g., electrical contacts, connectors, leads, wires, or other such components that can pass electric signals) of plug 1204 may engage electronic connections of receptacle 1260 when plug 1204 is inserted into receptacle 1260. Electronic device 1250 may include a covering 1252A. Covering 1252A may be, for example, a thick case or other protective or cosmetic cover for electronic device 1250. Due to the thickness of covering 1252A, retractable connector 1206 may be fully extended so that the electrical connections of plug 1204 may be able to engage the electrical connections of receptacle 1260. As shown in FIG. 12A, retractable connector 1206 may be configured so that, when retractable connector 1206 is fully extended, covering 1252A fitted on electronic device 1250 may be positioned proximate to bezel 1218 with a minimal (e.g., less than 1 mm, less than 3 mm, less 5 mm, less than 10 mm, or 10 mm or greater) gap. As such, the fully extended positioned may be configured to accommodate very thick coverings for electronic devices.

In FIG. 12B, retractable connector 1206 may be partially extended and thus, may extend less than that of FIG. 12A.

Accordingly, the distance between plug 1204 and bezel 1218 is distance 1280B, which is less than that of distance 1280A of FIG. 12A. Similar to FIG. 12A, in FIG. 12B, plug 1204 of retractable connector 1206 is inserted into receptacle 1260 of electronic device 1250 and, thus, electrical connections of plug 1204 may be engaged with electronic connections of receptacle 1260. Electronic device 1250 may include a covering 1252B. Covering 1252B may be different in thickness from 1252A of FIG. 12A. For example, covering 1252B may be thinner than covering 1252A. Covering 1252B may be another embodiment of, for example, a case or other protective or cosmetic cover for electronic device 1250. As covering 1252B is thinner than covering 1252A, retractable connector 1206 may only be partially extended before the electrical connections of plug 1204 are able to engage the electrical connections of receptacle 1260.

In FIG. 12C, retractable connector 1206 may be fully retracted. Accordingly, the distance between plug 1204 and bezel 1218 is distance 1280C, which is less than that of distance 1280A and 1280B. In FIG. 12C, plug 1204 is inserted into receptacle 1260 of electronic device 1250. As shown in FIG. 12C though, electronic device 1250 may not have a cover. As such, retractable connector 1206 is fully retracted. As electronic device 1204 does not include a case, even when fully retracted, the electrical connections of plug 1204 are able to engage the electrical connections of receptacle 1260. However, as shown in FIG. 12C, retractable connector 1206 may be configured so that, when retractable connector 1206 is fully retracted, electronic device 1250 may be positioned proximate to bezel 1218 with a minimal (e.g., less than 1 mm, less than 3 mm, less 5 mm, or less than 10 mm) gap.

In certain other embodiments, the fully retracted position may be different from that shown in FIG. 12C. For example, in certain embodiments, retractable connector 1206, when fully retracted, may have the plane of the connector (e.g., the portion that is not the plug 1204) level with bezel 1218. As such, when plug 1204 is inserted into the receptacle 1260, electronic device 1250 may contact bezel 1218. In other embodiments, in the fully retracted position, plug 1204 may be fully or partially disposed within cavity 1248 and/or retractable connector 1206 may position plug 1204 behind bezel 1218 (e.g., when viewed from the viewpoint of FIG. 12C, the leftmost tip of plug 1204 may be positioned to the right of bezel 1218) and, accordingly, bezel 1218 may protect plug 1204 and retractable connector 1206 from damage when retractable connector 1206 is in the fully retracted position.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

I claim:

1. An apparatus comprising:
    a housing comprising an opening;
    an electrical circuit disposed within the housing;
    a connector configured to interface with an external electronic device and disposed at least partially within the housing, the connector comprising a plug pluggable into the external electronic device, the plug being extendable and retractable by being translated relative to the housing along an axis passing through the plug to assume any position of a plurality of positions relative to the housing, wherein the plug in each of the plurality of positions extends outside the housing by a respective distance different for different positions, to be pluggable in each position into the external electronic device to electrically connect the external electronic device to the electrical circuit,
    the connector having a surface that at least partially comprises one or more first features each of which comprises a protrusion or an indentation, wherein at least a portion of the connector is disposed within the opening; and
    the apparatus comprises an adjuster at least partially disposed within the housing and comprising one or more second features each of which comprises an indentation or a protrusion to mate respectively with the protrusion or the indentation of at least one of the one or more first features to adjust a position of the plug and hold the plug in each of the plurality of positions by resisting plug-extending and plug-retracting forces applied to the plug along the axis, the one or more second features being disposed at least partially around the axis.

2. The apparatus of claim 1, further comprising a holding mechanism disposed within the housing, coupled to the connector and the adjuster, and configured to, when in a holding position, hold the adjuster to hold the connector in any desired position of the plurality of positions, and wherein the holding mechanism comprises a spring, a cam, a lock, a friction fit, and/or a ratchet.

3. The apparatus of claim 2, wherein the holding mechanism is configured to apply a force to, at least, the adjuster to hold the connector in any desired position of the plurality of positions.

4. The apparatus of claim 2, wherein the holding mechanism is a button configured to move between, at least, the holding position and an open position, and configured to prevent movement of the connector in the holding position and allow movement of the connector in the open position.

5. The apparatus of claim 2, wherein the holding mechanism comprises a lock, the connector further comprises a plurality of notches on at least a first surface, and each of the plurality of notches is configured to receive the lock to prevent movement of the connector.

6. The apparatus of claim 2, wherein the holding mechanism comprises a spring, and wherein the spring is a leaf spring, a coil spring, a flat spring, a cantilever spring, a helical spring, and/or a torsion spring.

7. The apparatus of claim 2, wherein the one or more first features are threads, and the holding mechanism is configured to apply a force such that the connector is held in any desired position of the plurality of positions until a force greater than the threshold force is applied.

8. The apparatus of claim 1, wherein the one or more first features are threads.

9. The apparatus of claim 2, further comprising a retainer coupled to, at least, the holding mechanism and a portion of the housing and configured to couple the holding mechanism to the adjuster.

10. The apparatus of claim 2, further comprising a gasket, disposed between, at least, the adjuster and the holding mechanism, and wherein the connector in each of the plurality of positions at least partially extends outside the housing.

11. The apparatus of claim 1, further comprising an imaging module coupled to the electrical circuit and at least partially disposed within the housing.

12. The apparatus of claim 11, wherein the imaging module is an infrared imaging module.

13. The apparatus of claim 1, wherein the adjuster is configured to adjust the position of the connector to any position of an infinitely variable number of positions within an adjustment range.

14. The apparatus of claim 1, wherein the adjuster is rotatable about the axis passing through the plug to adjust the position of the plug.

15. The apparatus of claim 1, further comprising at least one of:
   a flexible board, wherein the connector is coupled to the electrical circuit via the flexible board; and/or
   a cable, wherein the connector is coupled to the electrical circuit via the cable.

16. The apparatus of claim 1, wherein the connector is configured to transfer data to the external electronic device when interfacing with the external electronic device.

17. A method of assembling the apparatus of claim 1, comprising:
   disposing the connector within the housing, wherein at least a portion of the connector is disposed within the opening;
   coupling the adjuster to the connector; and
   coupling the electrical circuit to the connector.

18. The method of claim 17, further comprising:
   disposing a holding mechanism within the housing and coupling the holding mechanism to the adjuster; and
   coupling a retainer to the holding mechanism.

19. The method of claim 18, wherein the retainer is configured to preload the holding mechanism.

20. The method of claim 17, wherein the electrical circuit is coupled to the connector via a flexible board and/or one or more cables.

* * * * *